United States Patent
Liu et al.

(10) Patent No.: US 9,219,525 B2
(45) Date of Patent: Dec. 22, 2015

(54) SOCKET (71) Applicants: HISENSE CO., LTD., Qingdao (CN); Hisense USA Corporation, Suwanee, GA (US)

(72) Inventors: Meng Liu, Qingdao (CN); Yangyang Li, Qingdao (CN); Yuewei Lin, Qingdao (CN); Wei Zhao, Qingdao (CN); Xuanwei Zhang, Qingdao (CN); Yunxiang Zhuang, Qingdao (CN); Haibin Liu, Qingdao (CN)

(73) Assignees: HISENSE CO., LTD., Qingdao (CN); HISENSE USA CORPORATION, Suwanee, GA (US)

( * ) Notice: Subject to any disclaimer, the term of this patent is extended or adjusted under 35 U.S.C. 154(b) by 22 days.

(21) Appl. No.: 14/250,291

(22) Filed: Apr. 10, 2014

(65) Prior Publication Data
US 2015/0146799 A1    May 28, 2015

(30) Foreign Application Priority Data

Nov. 26, 2013  (CN) .......................... 2013 1 0618233
Dec. 12, 2013  (CN) .......................... 2013 1 0682723
Dec. 12, 2013  (CN) .......................... 2013 2 0822312

(51) Int. Cl.
*H04B 3/00* (2006.01)
*H04L 25/00* (2006.01)
*H04B 3/54* (2006.01)
*H01R 24/76* (2011.01)
*H01R 31/06* (2006.01)

(52) U.S. Cl.
CPC *H04B 3/54* (2013.01); *H01R 24/76* (2013.01); *H01R 31/065* (2013.01)

(58) Field of Classification Search
CPC ......... H04B 3/54; H01R 24/76; H01R 31/065
USPC ...................................................... 375/257
See application file for complete search history.

(56) References Cited

U.S. PATENT DOCUMENTS

2012/0201312 A1* 8/2012 Schwager ...................... 375/257
2013/0330947 A1* 12/2013 Peng et al. ..................... 439/173

* cited by examiner

*Primary Examiner* — Nader Bolourchi (57) ABSTRACT

Provided is a socket including a socket body and a jack, wherein a network communication module is arranged inside the socket body; and the network communication module is connected with a mains line; and the network communication module is configured to provide a user with transmission of a network signal of the Internet through the mains line. The network communication module is arranged inside the socket body to provide the user with transmission of the network signal of the Internet through the mains line, so that the function to access the Internet through the mains line by means of the socket is enabled, to thereby address the problems of one of limited jack locations occupied, a part of an indoor space occupied and some of resources wasted for a wall-plugged power modem.

22 Claims, 8 Drawing Sheets

Socket cassette        Socket body        Socket panel

SOCKET

CROSS-REFERENCES TO RELATED APPLICATIONS

This application claims priorities to Chinese patent application No. 201310618233.3 filed on Nov. 26, 2013, Chinese patent application No. 201310682723.X, filed on Dec. 12, 2013, and Chinese patent application No. 201320822312.1, filed on Dec. 12, 2013, the contents of which are incorporated herein by reference in their entirety.

FIELD OF THE INVENTION

The present invention relates to the field of communications and particularly to a socket capable of communication.

BACKGROUND OF THE INVENTION

Power Line Communication (PLC) refers to a special communication mode in which voice or data is transmitted using a high-voltage power line (typically at a voltage level of 35 kV or above in the field of a power carrier), a medium-voltage power line (at a voltage level of 10 kV) or a low-voltage distribution line (a subscriber line at 380/220V) as an information transmission medium.

A power-line based wall-plugged communication apparatus, e.g., a power modem, is often used at home to have a terminal device networked. The power modem, also referred to as a power network bridge, is a device which modulates a network signal onto a power line to address the problem of network wiring by means of the existing power line.

SUMMARY OF THE INVENTION

An embodiment of the invention provides a socket including a socket body and a jack, wherein a network communication module is arranged inside the socket body; and the network communication module is connected with a mains line; and the network communication module is configured to provide a user with transmission of a network signal of the Internet through the mains line.

According to the embodiment of the invention, the network communication module is arranged inside the socket body to provide the user with transmission of the network signal of the Internet through the mains line, so that the socket itself is capable of communication over the power line network and the function to access the Internet through the mains line by means of the socket is enabled, so the user can access the Internet without occupying any additional socket jack, to thereby address the problems of one of limited jack locations occupied and some of resources wasted for a wall-plugged power modem. Since the socket is a power device indispensable at home everywhere, a family member can access the Internet by means of the socket according to this embodiment, so the socket according to the embodiment of the invention is applicable, saves an indoor space and conserves the limited natural resources.

DETAILED DESCRIPTION OF THE EMBODIMENTS

Figure 1:
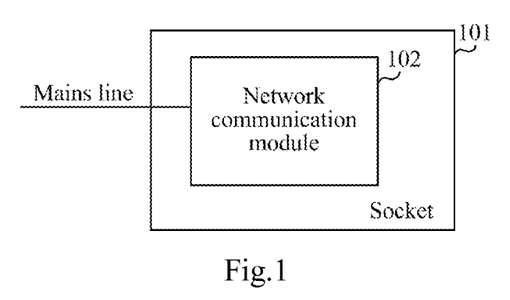
FIG. 1 is a schematic structural diagram of a socket according to a first embodiment of the invention.

FIG. 1 is a schematic structural diagram of a socket according to a first embodiment of the invention.

As illustrated in FIG. 1, in a socket 101 according to the first embodiment of the invention, there is arranged a network communication module 102 connected with a mains line and configured to provide a user with transmission of a network signal of the Internet through the mains line.

By way of an example, the socket 101 may be a socket installed inside a wall or may be a power strip, and this embodiment will not be limited thereto.

As for the network communication module 102, in this embodiment, the network communication module 102 may be added inside the existing socket, and the network communication module 102 can obtain the network signal on the mains line, connected with the socket 101, carrying the network signal and provide the user with the network signal and can receive a network signal transmitted from an Internet access device of the user and load the network signal onto the mains line connected with the socket 101. The network communication module 102 may be a chip or an integrated circuit board, capable of communication over a power line network, of any model produced by any manufacturer.

Since there is some spare space, inside a cassette of the existing socket, sufficient to have the network communication module 102 placed inside the socket, the placement of the network communication module 102 inside the existing socket will not result in an increase in the volume of the socket.

In this embodiment, the network communication module is arranged inside the socket to provide the user with transmission of the network signal of the Internet through the mains line, so that the socket itself is capable of communication over the power line network and the function to access the Internet through the mains line by means of the socket is enabled, so the user can access the Internet without occupying any additional socket jack, to thereby address the problems of one of limited jack locations occupied, a part of an indoor space occupied and some of resources wasted for a wall-plugged power modem. Since the socket is a power device indispensable at home everywhere, a family member can access the Internet by means of the socket according to this embodiment, so the socket according to this embodiment is highly applicable and saves the limited natural resources.

The technical solution according to the invention will be detailed below by way of several embodiments thereof.

Figure 2:
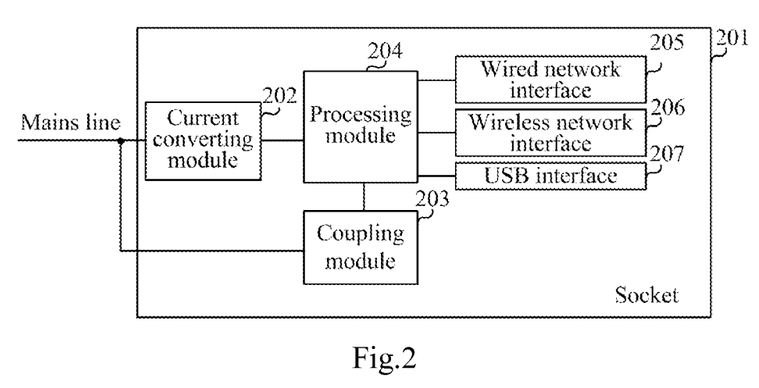
FIG. 2 is a schematic structural diagram of a socket according to a second embodiment of the invention.

FIG. 2 is a schematic structural diagram of a socket according to a second embodiment of the invention. In this embodiment, further to the foregoing embodiment, the network communication module may include a current converting module, a coupling module and a processing module.

As illustrated in FIG. 2, the socket 201 according to the second embodiment of the invention includes a current converting module 202, a coupling module 203, a processing module 204, a wired network interface 205, a wireless network interface 206 and a Universal Serial Bus (USB) interface 207.

The socket 201 may be a socket installed inside a wall or may be a power strip, and this embodiment will not be limited thereto.

The current converting module 202 is connected with a mains line and configured to convert an alternating-current signal transmitted on the mains line into a direct-current signal and to provide the processing module 204 with the direct-current signal to provide the processing module 204 with an operating voltage. The current converting module 202 may be a transformer, a rectifying device, etc.

The coupling module 203 is connected with the mains line and the processing module 204 and configured to extract a network signal from the alternating-current signal transmitted on the mains line, to transmit the extracted network signal to the processing module 204, to receive a network signal from the processing module 204 and to load the received network signal onto an alternating-current signal transmitted on the mains line. The coupling module 203 may be an Alternating Current (AC) coupler or any electrical component or combination of electrical components with this function.

The processing module 204 is connected with the current converting module 202 and the coupling module 203 and configured to receive the network signal transmitted by the coupling module 203, to demodulate the network signal, to provide the user or an external network access terminal with the demodulated network signal via at least one of the wired network interface 205, the wireless network interface 206 and the USB interface 207, to receive a network signal, transmitted by the user through the terminal device or the external network access terminal, via at least one of the wired network interface 205, the wireless network interface 206 and the USB interface 207, to modulate the network signal and to transmit the modulated network signal to the coupling module 203. The user terminal device may be a smart phone, a tablet computer, a Personal Computer (PC), etc. The external network access terminal may be an ADSL broadband access terminal, an optical-fiber broadband access terminal, a wireless Internet access card, etc. The processing module 204 may be a chip or an integrated circuit board, capable of modulating and demodulating the network signal, of any model produced by any manufacturer.

The wired network interface 205 is connected with the processing module 204 and configured to receive the network signal transmitted by the processing module 204, to transmit the network signal to the user or the external network access terminal through a network cable, a telephone wire or in another wired way, to receive the network signal transmitted by the user or the external network access terminal through the network cable, the telephone wire or in another wired way and to transmit the network signal to the processing module 204. The wired network interface 205 is an interface of the socket 201 for wired connection to its external local area network user or the external network access terminal and may be an interface for engagement with a network cable crystalline head, a telephone wire crystalline head, etc.

The wireless network interface 206 is connected with the processing module 204 and configured to receive the network signal transmitted by the processing module 204, to transmit the network signal to the user or the external network access terminal through WiFi, Zigbee or the like, to receive the network signal transmitted by the user or the external network access terminal through WiFi, Zigbee or the like and to transmit the network signal to the processing module 204. The wireless network interface is an interface of the socket 201 for wireless connection to its external local area network user or the external network access terminal and may be any wireless signal transceiver.

The USB interface 207 is connected with the processing module 204 and a USB port accessible to a USB device which can be a U-disk, a mobile hard disk, a cellular phone, an iPod, a wireless Internet access card, etc.

When a family member accesses an external network through the socket according to this embodiment, any such a socket in a room needs to be connected with the external network access terminal through at least one of the wired network interface 205, the wireless network interface 206 and the USB interface 207 to provide the family member with an external network signal of the external network access terminal for use. In the technical solution according to this embodiment, the current converting module, the coupling module, the processing module, the wired network interface, the wireless network interface and the USB interface are arranged inside the socket, so that the socket is capable of network communication. A U-disk is plugged into the socket in a room of a house, and a family member in another room in the house can access data stored in the U-disk to enable the function to share the data.

Figure 3:
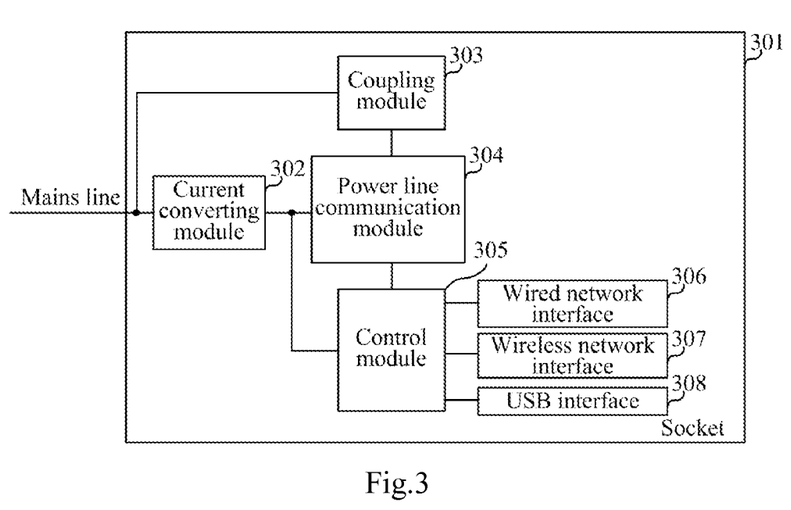
FIG. 3 is a schematic structural diagram of a socket according to a third embodiment of the invention.

FIG. 3 is a schematic structural diagram of a socket according to a third embodiment of the invention. In this embodiment, further to the foregoing embodiment, the processing module may include a control module and a power line communication module.

As illustrated in FIG. 3, the socket 301 according to the third embodiment of the invention includes a current converting module 302, a coupling module 303, a power line communication module 304, a control module 305, a wired network interface 306, a wireless network interface 307 and a USB interface 308.

The socket 301 may be a socket installed inside a wall or may be a power strip, and this embodiment will not be limited thereto.

The current converting module 302 is connected with a mains line and configured to convert an alternating-current signal transmitted on the mains line into a direct-current signal and to provide the power line communication module 304 and the control module 305 with the direct-current signal to provide them with an operating voltage. The current converting module 302 may be a transformer, a rectifying device, etc.

The coupling module 303 is connected with the mains line and configured to extract a network signal from the alternating-current signal transmitted on the mains line, to transmit the extracted network signal to the power line communication module 304, to receive a network signal from the power line communication module 304 and to load the received network signal onto an alternating-current signal transmitted on the mains line. The coupling module 303 may be an Alternating Current (AC) coupler or any electrical component or combination of electrical components with this function.

The power line communication module 304 is connected with the current converting module 302 and the coupling module 303 and configured to receive the network signal transmitted by the coupling module 303, to demodulate the network signal, to transmit the demodulated network signal to the control module 305, to receive a network signal transmitted by the control module 305, to modulate the network signal and to transmit the modulated network signal to the coupling module 303. The power line communication module 304 may be a power line communication chip.

The control module 305 is connected with the current converting module 302 and the power line communication module 304 and configured to receive the network signal transmitted by the power line communication module 304, to provide the user or an external network access terminal with the network signal via at least one of the wired network interface 306, the wireless network interface 307 and the USB interface 308, to receive a network signal, transmitted by the user through the terminal device or the external network access terminal, via at least one of the wired network interface 306, the wireless network interface 307 and the USB interface 308 and to transmit the network signal to the power line communication module 304. The control module 305 may be a chip or an integrated circuit board, capable of transmitting the demodulated network signal via the wired network interface, the wireless network interface and the USB interface and receiving the network signal via the wired network interface, the wireless network interface and the USB interface, of any model produced by any manufacturer.

All of the wired network interface 306, the wireless network interface 307 and the USB interface 308 are connected with the control module 305 and have the same functions as those in the foregoing embodiment, and a repeated description thereof will be omitted here.

In the technical solution according to this embodiment, the current converting module, the coupling module, the power line communication module, the control module, the wired network interface, the wireless network interface and the USB interface are arranged inside the socket, so that the socket is capable of network communication and sharing multimedia data.

Further to the foregoing embodiment, the other modules than the current converting module on the network communication module are integrated on a digital circuit board of the socket, and the current converting module is integrated on a power source board of the socket. Specifically, when the network communication module includes the current converting module, the coupling module and the processing module, the coupling module and the processing module are integrated on the digital circuit board, and when the processing module further includes the control module and the power line communication module, the coupling module, the control module and the power line communication module are integrated on the digital circuit board. That is, the respective modules performing the power line communication function are integrated on the digital circuit board, and these modules are weak current modules; and the current converting module is integrated on the power source board, and the current converting module is a strong current module.

The strong current module may generate electromagnetic interference with the weak current modules. Separate integration of the strong current module and the weak current modules on the different circuit boards enables separation of the strong current module from the weak current modules and decreases possible electromagnetic interference of the strong current module to the weak current modules.

Further to the foregoing embodiment, furthermore, an electromagnetic shielding case is arranged outside the power source board to isolate the respective weak current modules on the digital circuit board from electromagnetic interference arising from an electromagnetic wave generated by the current converting module on the power source board. The shape of the electromagnetic shielding case agrees with the shape of the power source board. The electromagnetic shielding case may be an electromagnetic shielding case of any material produced by any manufacturer.

Alternatively, further to the foregoing embodiment, furthermore, the digital circuit board is isolated from the power source board. Specifically, an isolating plate may be arranged between the digital circuit board and the power source board, or the digital circuit board and the power source board may be arranged on two opposing sides inside the space of a cassette of the socket, so that the digital circuit board is spaced away from the power source board. Electromagnetic interference of the strong current module to the weak current modules can be further decreased.

Further to the foregoing embodiment, furthermore, the digital circuit board is arranged at an angle to the power source board.

Further to the foregoing embodiment, furthermore, the digital circuit board is arranged orthogonal to the power source board. Due to the limited space inside the cassette of the socket, the arrangement of the digital circuit board orthogonal to the power source board can decrease electromagnetic interference of the strong current module to the weak current modules as much as possible inside the limited space.

Further to the foregoing embodiment, a vent is arranged at a spare location on the surface of the socket, and optionally, the vent is arranged on a spare part of the surface proximate to the digital circuit board. Since the components on the digital circuit board may generate heat in operation, the arrangement of the vent proximate to the digital circuit board can facilitate dissipation of heat, so that the respective components on the digital circuit board can operate with more stable performance.

Figure 4:
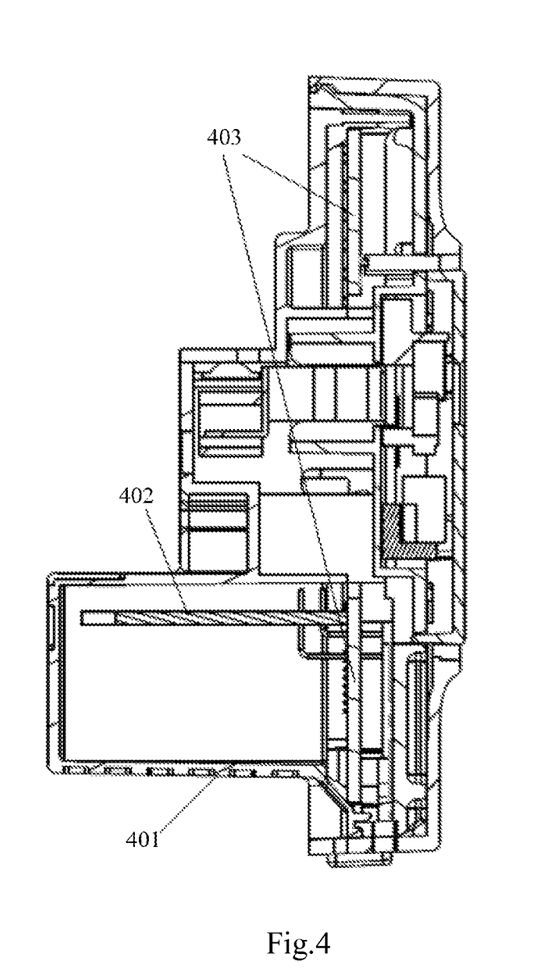
FIG. 4 is a schematic sectional structural diagram of a socket according to a fourth embodiment of the invention.

FIG. 4 is a schematic sectional structural diagram of a socket according to a fourth embodiment of the invention.

Figure 5:
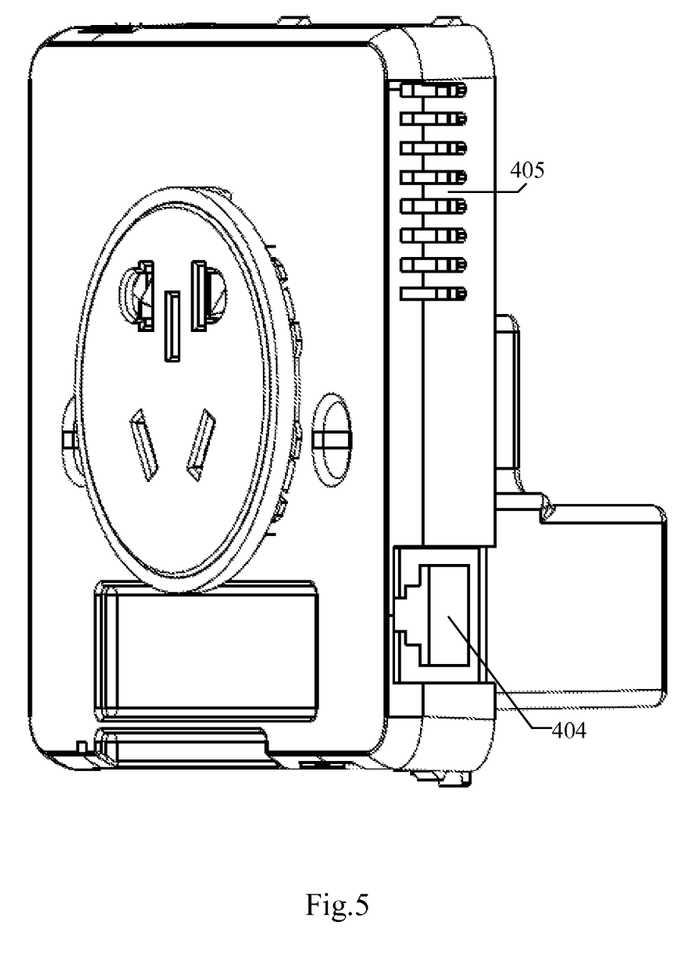
FIG. 5 is a schematic side structural diagram of the socket according to the fourth embodiment of the invention.

FIG. 5 is a schematic side structural diagram of the socket according to the fourth embodiment of the invention.

As illustrated in FIG. 4 and FIG. 5, the socket according to the fourth embodiment of the invention includes a socket body 401, a power source board 402, a digital circuit board 403, a network interface 404 and a vent 405.

The power source board 402, the digital circuit board 403 and the network interface 404 are arranged inside the socket body 401, the power source board 402 is connected with a mains line, the digital circuit board is connected respectively with the power source board and the mains line, the network interface 404 is connected with the digital circuit board 403, and a wireless signal transceiver is further arranged on the digital circuit board 403, and the vent 405 is arranged on a housing of the socket body 401.

The socket body 401 is a body of a wall-plugged socket.

The power source board 402 is configured to convert an alternating-current signal transmitted on the mains line into a direct-current signal to provide the digital circuit board 403 with operating current. A transformer, a rectifier, etc., may be arranged on the power source board 402.

The digital circuit board 403 is configured to obtain a network signal from the mains line and to load a network signal onto the mains line. The digital circuit board 403 obtains the network signal from the mains line carrying the network signal, transmits the network signal to a user via the network interface 404 or through a wireless signal transceiver arranged thereon, and receives the network signal for transmission via the network interface 404 or through the wireless signal transceiver arranged thereon. The digital circuit board 403 may be a chip or an integrated circuit board, capable of communication over a power line network, of any model produced by any manufacturer. It shall be noted that one digital circuit board 403 is arranged in this embodiment. FIG. 4 is a sectional view of this embodiment, and since a central part of the digital circuit board 403 is obscured by a jack of the socket, the digital circuit board 403 appears as two ones although it is actually one integral digital circuit board 403.

The network interface 404 may be an RJ45 network interface, a telephone wire network interface, etc.

The wireless signal transceiver is arranged on the digital circuit board 403. Since the wireless signal transceiver is arranged on the digital circuit board 403, the wireless signal transceiver is not illustrated in the figure. The wireless signal transceiver is configured to transmit the network signal to the user through WiFi, Zigbee or the like and to receive the network signal transmitted by the user through WiFi, Zigbee or the like and may be any wireless signal transceiver.

The vent 405 is arranged at a position of the housing of the socket body proximate to the digital circuit board 403. The digital circuit board may generate heat in operation, and the arrangement of the vent proximate thereto can facilitate dissipation of heat.

In this embodiment, the digital circuit board is arranged inside the socket body to provide the user with the network signal through the mains line, so that the socket itself is capable of communication over the power line network and the function to access the Internet through the mains line by means of the socket is enabled, so the user can access the Internet without occupying any additional socket jack, to thereby address the problems of one of limited jack locations occupied, a part of an indoor space occupied and some of resources wasted for a wall-plugged power modem. Since the socket is a power device indispensable at home everywhere, a family member can access the Internet by means of the socket according to this embodiment, so the socket according to this embodiment is highly applicable, saves the indoor space and conserves the limited natural resources.

Figure 6:
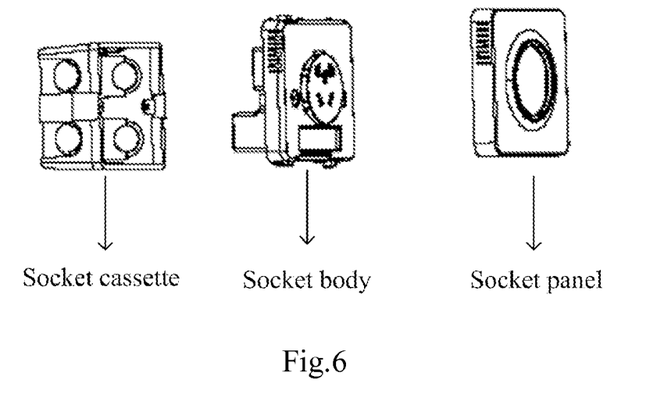
FIG. 6 is a schematic structural diagram of a socket according to a fifth embodiment of the invention.

FIG. 6 is a schematic structural diagram of a socket according to a fifth embodiment of the invention.

As illustrated in FIG. 6, the socket includes three parts which are a socket cassette, a socket body and a socket panel.

Figure 7:
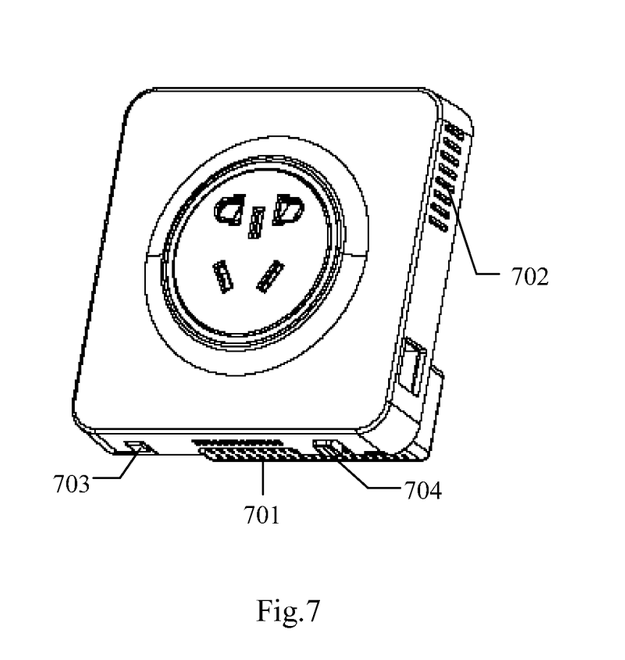
FIG. 7 is a schematic side structural diagram of the socket according to the fifth embodiment of the invention.

The cassette is a nationally standardized cassette, since there is some spare space in the cassette, the socket body with a digital circuit board, a power source board, etc., added thereto can also be put into the standardized cassette. The socket body includes components performing various functions of the socket, e.g., the function of power line communication, etc. The socket panel is a shell in agreement with the shape of the socket body and may be engaged on a housing of the socket body. FIG. 7 illustrates the status in which the socket panel is engaged with the socket body.

Figure 8:
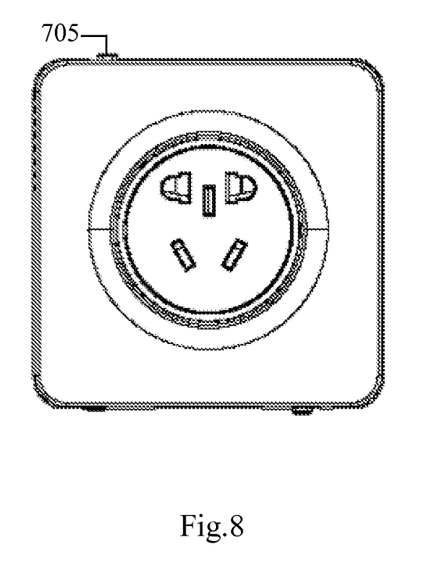
FIG. 8 is a schematic front structural diagram of the socket according to the fifth embodiment of the invention.

FIG. 7 is a schematic side structural diagram of the socket according to the fifth embodiment of the invention. FIG. 8 is a schematic front structural diagram of the socket according to the fifth embodiment of the invention.

As illustrated in FIG. 7 and FIG. 8, further to the fourth embodiment, the socket according to the fifth embodiment of the invention further includes an intake 701, an outtake 702, a first button 703, a second switch 704, a first indicating lamp and a first switch 705.

The first button 703, the second switch 704, the first switch 705 and the first indicating lamp are connected with the digital circuit board.

The two vents including the intake 701 and the outtake 702 are arranged on the housing of the socket body, and the arrangement of the two vents can further facilitate heat dissipation of the socket. Correspondingly, two vents are also arranged on the socket panel, and the vents arranged on the socket panel match with the vents arranged on the housing of the socket body.

The first button 703 is configured to resume the socket into an original manufacturer setting or to enable the digital circuit board of the socket to negotiate with a digital circuit board of another socket about a key. When a user presses the first button 703 for more than 10 seconds, parameters stored in the digital circuit board are resumed into an original manufacturer setting. The parameters include but will not be limited to a key, a Service Set Identifier (SSID) number, a frequency band setting, a security type, etc. The user presses the first button 703 of a socket for 1-3 seconds and then presses the first button of another socket for 1-3 seconds, and the digital circuit boards of the two sockets start automatic negotiation about a communication key, and the digital circuit boards of the two sockets obtain the key as a result of negotiation and encrypt or decrypt a network signal using the key obtained as a result of negotiation. The first button may be a button component of any model produced by any manufacturer. It shall be noted that this embodiment will not be limited to any period of time for which the first button is pressed, and those skilled in the art may set any period of time for which the first button is pressed as needed in practice.

The first switch 705 is configured to control the digital circuit board to be enabled or disabled. With the digital circuit board enabled, the digital circuit board performs the functions of power line communication, network communication, a Light Emitting Diode (LED) indicating lamp, etc. With the digital circuit board disabled, the socket according to this embodiment has the same functions as a conventional socket, that is, the socket provides the user with a power signal via a jack. The first switch 705 may be a switch, capable of switching an operating mode of the socket, of any model produced by any manufacturer.

The second switch 704 is configured to switch an operating mode of the socket, and the operating mode includes a gateway mode (i.e., a router mode) and an extender mode. When a family member needs to access an external network through the socket, a socket in a room needs to be set as the gateway mode, and a network interface of the socket is connected with an external network terminal, and other sockets are set as the extender mode. The socket set as the gateway mode receives a network signal of the external network through the network interface and loads the network signal onto the mains line, and the sockets set as the extender mode obtain the network signal from the mains line and provide the user with the network signal via the network interface or the wireless signal transceiver. The second switch 704 may be a switch, capable of switching an operating mode of the socket, of any model produced by any manufacturer.

The first indicating lamp is arranged inside the socket body. The first indicating lamp is configured to indicate a PLC connection status. The first indicating lamp may emit light in different colors at different frequencies, for example, the first indicating lamp emitting continuous red light indicates that there is no PLC connection of the socket with another socket; the first indicating lamp emitting continuous green light indicates that there is a PLC connection of the socket with another socket, both of which encrypt the network signal transmitted on the mains line by means of a key; and the first indicating lamp emitting flashing light in any color indicates the digital circuit board of the socket is negotiating with a digital circuit board of another socket about a communication key. The first indicating lamp may be further configured to indicate other statuses of the socket, for example, the first indicating lamp emitting orange light indicates that the socket provides the user with the network signal through WiFi, the first indicating lamp continuously flashing twice indicates successful negotiation of the digital circuit board of the socket with a digital circuit board of another socket about a key, etc. It shall be noted that this embodiment will not be limited to any color in which the first indicating lamp emits light, any frequency at which the first indicating lamp flashes, etc. Those skilled in the art can set any color in which the first indicating lamp emits light, any frequency at which the first indicating lamp flashes, etc., as needed in practice. It shall be noted that the first indicating lamp arranged inside the socket body is not illustrated in the figure.

An annular light transmitting area is arranged at the section where the jack of the socket according to this embodiment is engaged with the socket panel, to transmit the light emitted by the first indicating lamp.

With the first button, the first switch, the second switch and the first indicating lamp, the power line communication function of the socket can be further optimized and the appearance of the socket can be made more appealing.

Further to the foregoing embodiment, the digital circuit board is arranged at an angle to the power source board, e.g., at 35 degrees, 70.6 degrees, 90 degrees, etc. Since the power source board is configured to convert a high-voltage alternating-current signal into a low-voltage direct-current signal, the power source board is a strong current module. The digital circuit board is a weak current module. The strong current module may generate electromagnetic interference to the weak current module. The arrangement of the power source board at an angle of 90 degrees to the digital circuit board can decrease electromagnetic interference of the strong current module to the weak current module.

A technical solution of switching an operating mode of the socket through the second switch in the foregoing embodiment of the invention will be further detailed below with reference to the drawings and embodiments thereof.

In the prior art, a router can be used as a gateway or an extender. In general, an operating mode of the router is preset by a manufacturer, and the operating mode of the router cannot be changed after shipment. That is, the router preset as the gateway mode can only be used as a gateway after shipment, and the router preset as extender mode can only be used as an extender after shipment.

In a Fiber To The Home (FTTH) or Asymmetric Digital Subscriber Line (ADSL) or another broadband access mode, after a fiber or broadband access is directed to a room, when a user attempts to change the location of the broad access, for example, from a living room to a master bedroom, since the operating mode of a router cannot be changed after being preset, in this case, a gateway and an extender in the two rooms have to be transported manually to adjust their locations.

Figure 9:
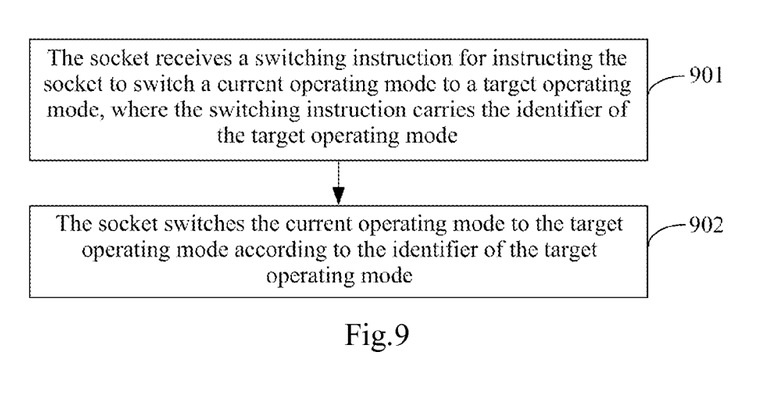
FIG. 9 is a schematic diagram of a method of setting an operating mode of a socket according to an embodiment of the invention.

In view of the problems in the prior art that the router is in a single operating mode and its preset operating mode cannot be changed, a socket according to an embodiment of the invention can function as a router, and FIG. 9 illustrates a schematic diagram of a method of setting an operating mode of a socket according to an embodiment of the invention. An executor of this method is a processor with the router function in the socket. The processor may be a chip or integrated circuit board with the router function of any model produced by any manufacturer, or may be one or more chips or integrated circuit boards where the processing module, the control module or the network communication module is located. The processor is connected with the second switch and configured to execute program codes to set an operating mode of the socket. As illustrated in FIG. 9, the method includes the following steps.

901. The socket receives a switching instruction for instructing the socket to switch a current operating mode to a target operating mode, where the switching instruction carries the identifier of the target operating mode.

902. The socket switches the current operating mode to the target operating mode according to the identifier of the target operating mode.

In practice, in an FTTH or ADSL or another broadband access mode, when a user wants to change the location of a broadband access, the socket may receive the switching instruction transmitted by the user for instructing the socket to switch the current operating mode to the target operating mode, where the switching instruction carries the identifier of the target operating mode.

Optionally, a mode selection switch (that is the second switch in the foregoing embodiment) is arranged on the socket, and when the user wants to change the current operating mode of the socket, the user may transmit the switching instruction to the socket by toggling the mode selection switch. Generally, the socket is set with two operating modes including a gateway mode and an extender mode upon shipment. The mode selection switch is provided with two shifts, one of which is a first shift relating to the gateway mode and the other of which is a second shift relating to the extender mode.

In this embodiment, when the user toggles the mode selection switch to the first shift, it indicates that the target operating mode is the gateway mode, which may be identified by "1", and "1" may be carried in the switching instruction, and the socket may know from "1" carried in the switching instruction that the target operating mode to be switched to is the gateway mode; and when the user toggles the mode selection switch to the second shift, it indicates that the target operating mode is the extender mode, which may be identified by "0", and "0" may be carried in the switching instruction, and the socket may know from "0" carried in the switching instruction that the target operating mode to be switched to is the extender mode.

Optionally, when the user toggles the switch, the socket may detect a change in level value of a General Purpose Input Output (GPIO), possibly from "0" to "1" or from "1" to "0". In this embodiment, "1" identifies the gateway mode, and "0" identifies the extender mode. The socket detects a change in level value from "1" to "0", and then switches from the gateway mode to the extender mode; and detects a change in level value from "0" to "1", and then switches from the extender mode to the gateway mode.

It shall be noted that the switching instruction received by the socket includes but will not be limited to one transmitted by the user toggling the mode selection switch. Optionally, a human-machine interaction module for human-machine interaction with the user is arranged in the socket, and the user may select the target operating mode through the human-machine interaction module and then transmit the switching instruction to the socket. For example, the user may transmit the switching instruction to the socket through a press key or a selection menu on the human-machine interaction module or a specific gesture; or a voice recognition module is arranged in the socket, and the user may transmit the switching instruction to the socket through voice; or a broadband access network cable automatic recognition module is arranged in the socket, and the user may transmit the switching instruction to the socket by plugging a network cable for a broadband access. In a practical application, the switching instruction is transmitted to the socket typically through the mode selection switch in an initialization setting process of the socket.

In this embodiment, the socket knows the target operating mode to be switched to from the identifier of the target operating mode in the switching instruction and then switches the current operating mode to the target operating mode. Specifically, the socket may judge whether the current operating mode is consistent with the target operating mode according to the identifier of the target operating mode in the switching instruction, and if a judgment result is negative, then the socket obtains a configuration file corresponding to the target operating mode.

Generally, a memory is arranged in the socket to store therein in advance configuration files of the two operating modes, and when it is judged that the target operating mode is not consistent with the current operating mode, the configuration file corresponding to the target operating mode can be downloaded. After the configuration file of the target operating mode is obtained, the socket runs the configuration file and configures the target operating mode through the configuration file, to switch the current operating mode to the target operating mode.

Optionally, after the current operating mode is switched to the target operating mode, the socket may send alert information, for example, the socket transmits the alert information by automatically popping up a dialogue box, through voice announcement, a beeper, an indicating lamp, e.g., a Light Emitting Diode (LED), a liquid crystal screen, etc., to notify the user that the operating mode of the socket has been switched to the target operating mode.

In the method of setting an operating mode of a socket according to this embodiment, the socket receives the switching instruction for instructing the socket to switch the current operating mode to the target operating mode, where the switching instruction carries the identifier of the target operating mode, and the socket switches the current operating mode to the target operating mode according to the identifier of the target operating mode. In this embodiment, the socket can switch the current operating mode in response to the switching instruction upon reception of the switching instruction, to thereby perform free switching of the socket between the gateway mode and the extender mode and overcome the problem in the prior art that the operating mode of the router cannot be changed, thus improving the router in the prior art.

Figure 10:
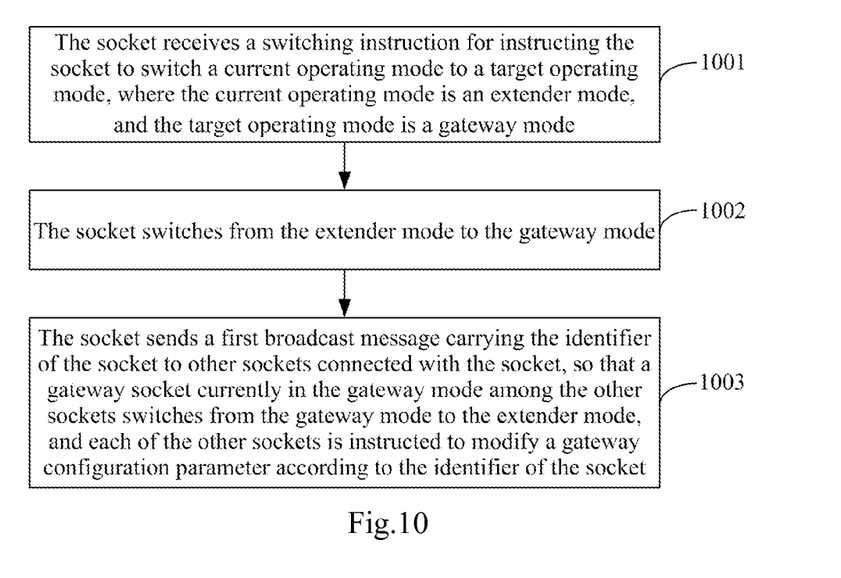
FIG. 10 is a schematic diagram of a method of setting an operating mode of a socket according to another embodiment of the invention.

FIG. 10 is a schematic diagram of another method of setting an operating mode of a socket according to an embodiment of the invention. As illustrated in FIG. 10, the method includes the following steps.

1001. The socket receives a switching instruction for instructing the socket to switch a current operating mode to a target operating mode, where the current operating mode is an extender mode, and the target operating mode is a gateway mode.

Generally, the socket is set with two operating modes including the gateway mode and the extender mode upon shipment, so the current operating mode of the socket may be the gateway mode or may be the extender mode.

When the current operating mode of the socket is the extender mode, the target operating mode is the gateway mode, and in this case, the socket may receive the switching instruction for instructing the socket to switch the current extender mode to the gateway mode. Reference can be made to the related disclosure in the foregoing embodiment for a description of the switching instruction, and a repeated description thereof will be omitted here.

1002. The socket switches from the extender mode to the gateway mode.

The socket switches from the current extender mode to the gateway mode upon reception of the switching instruction for instructing to switch from the extender mode to the gateway mode. Reference can be made to the related disclosure in the foregoing embodiment for the description of the switching process, and a repeated description thereof will be omitted here.

1003. The socket sends a first broadcast message carrying the identifier of the socket to other sockets connected with the socket, so that a gateway socket currently in the gateway mode among the other sockets switches from the gateway mode to the extender mode, and each of the other sockets is instructed to modify a gateway configuration parameter according to the identifier of the socket.

After the socket switches from the extender mode to the gateway mode, the socket broadcasts or uni-casts a notification message to all the other sockets in a Local Area Network (LAN) of the same network segment, to notify the other sockets of the change in current operating mode of the socket, so that the other sockets may adjust their own current operating modes according to the notification message, where the data format of the broadcast notification message complies with the Internet Protocol (IP) specification, and the other sockets may identify the notification message according to the data format of the notification message.

Specifically, the socket sends the first broadcast message carrying the identifier of the socket to the other sockets connected with the socket, where the identifier of the socket may be an IP address of the socket. The gateway socket currently in the gateway mode among the other sockets switches automatically the current gateway mode to the extender mode and is used as an extender upon reception of the first broadcast message. The other sockets may modify the gateway configuration parameter according to the identifier of the socket in the first broadcast message by modifying the IP address of the gateway to the IP address of the socket upon reception of the first broadcast message.

Optionally, a memory is arranged in the socket to store therein in advance IP addresses and/or Medium/Media Access Control (MAC) addresses of the respective sockets. In this embodiment, the socket may send the notification message respectively to each of the other sockets by means of the IP or MAC addresses.

Specifically, the socket obtains the address information of the gateway socket currently in the gateway mode among the other sockets connected with the socket from the pre-stored address information of the sockets, and the socket sends an instruction message to the gateway socket according to the address information of the gateway socket, and the gateway socket switches from the gateway mode to the extender mode upon reception of the instruction message. Furthermore, the socket sends a first notification message carrying the identifier of the socket respectively to each of the other sockets according to the address information of the each of the other sockets, and the each of the other sockets modifies the gateway configuration parameter according to the identifier of the socket by modifying the IP address of the gateway to the IP address of the socket.

Figure 11:
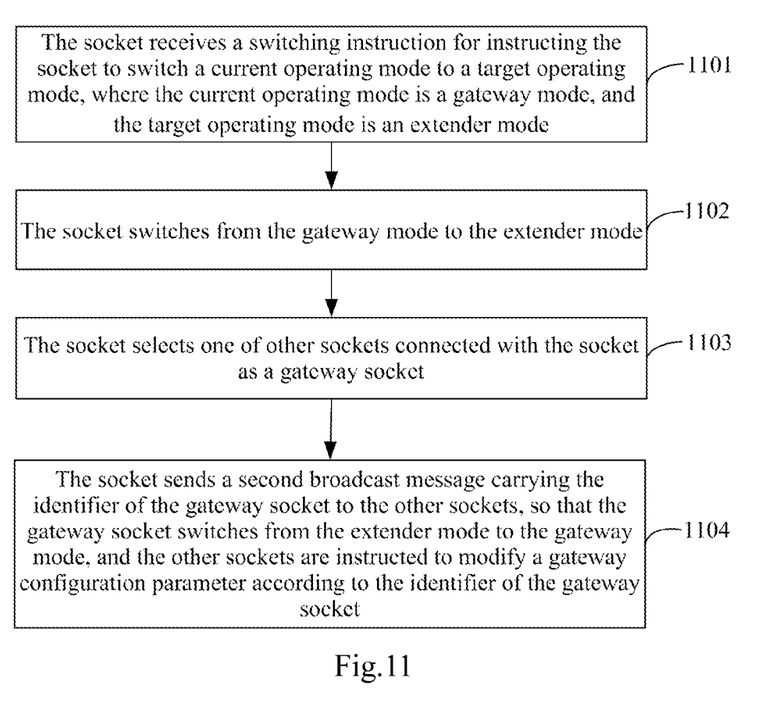
FIG. 11 is a schematic diagram of a method of setting an operating mode of a socket according to another embodiment of the invention.

FIG. 11 is another method of setting an operating mode of a socket according to an embodiment of the invention. As illustrated in FIG. 11, the method includes the following steps.

1101. The socket receives a switching instruction for instructing the socket to switch a current operating mode to a target operating mode, where the current operating mode is a gateway mode, and the target operating mode is an extender mode.

Generally, the socket is set with two operating modes including the gateway mode and the extender mode upon shipment, so the current operating mode of the socket may be the gateway mode or may be the extender mode.

When the current operating mode of the socket is the gateway mode, the target operating mode is the extender mode, and the socket may receive the switching instruction for instructing the socket to switch the current gateway mode to the extender mode. Reference can be made to the related disclosure in the foregoing embodiment for a description of the switching instruction, and a repeated description thereof will be omitted here.

1102. The socket switches from the gateway mode to the extender mode.

The socket switches from the current gateway mode to the extender mode upon reception of the switching instruction for instructing to switch from the gateway mode to the extender mode. Reference can be made to the related disclosure in the foregoing embodiment for the description of the switching process, and a repeated description thereof will be omitted here.

1103. The socket selects one of other sockets connected with the socket as a gateway socket.

1104. The socket sends a second broadcast message carrying the identifier of the gateway socket to the other sockets, so that the gateway socket switches from the extender mode to the gateway mode, and the other sockets are instructed to modify a gateway configuration parameter according to the identifier of the gateway socket.

The socket selects one of the other sockets connected with the socket as a gateway socket, and at this time the current operating mode of the gateway socket is the extender mode. The socket sends the second broadcast message carrying the identifier of the gateway socket to the other sockets, where the identifier of the gateway socket may be an IP address of the gateway socket. The gateway socket switches from the extender mode to the gateway mode upon reception of the second broadcast message. Each of the other sockets modifies the gateway configuration parameter by configuring the IP address of the gateway to the IP address of the gateway socket according to the identifier of the gateway socket upon reception of the second broadcast message.

Optionally, the socket selects one of the other sockets as a gateway socket, and the socket obtains the address information of the gateway socket from pre-stored address information of the sockets and sends an instruction message to the gateway socket according to the address information of the gateway socket, and the gateway socket switches from the extender mode to the gateway mode upon reception of the instruction message. Furthermore, the socket sends a second notification message carrying the identifier of the gateway socket respectively according to the address information of each of the other sockets, so that the each of the other sockets modifies the gateway configuration parameter according to the identifier of the gateway socket by configuring the IP address of the gateway to the IP address of the gateway socket.

The socket may be connected with the other sockets wirelessly, e.g., through WiFi, and then the socket may transmit a wireless signal and send a notification message to the other sockets wirelessly. However, the wireless signal may be subject to a through-wall loss when the socket transmits the wireless signal through a wall. In order to overcome the problem of the through-wall loss in transmission of the wireless signal, the technology of Power Line Communication (PLC) may be utilized to transmit data through a pre-embedded power line, to extend coverage of the wireless signal of the socket. In this embodiment, the socket is connected with the other sockets through a power line, so that the socket may send a notification message through the power line, to avoid the through-wall loss of the wireless signal. Optionally, the socket may be connected with the other sockets through a network cable and send a notification message to the other sockets through the network cable.

By way of an example, when a broadband access is directed to a living room, a socket in the living room is used as a gateway, that is, the socket in the living room is in an operating mode which is the gateway mode, and a socket in a master bedroom is used as an extender, that is, the socket in the master bedroom is in an operating mode which is the extender mode.

When a user attempts to have the broadband access directed to the master bedroom, the socket in the master bedroom needs to be used as a gateway, and the socket in the living room needs to be used as an extender, and in this case, the user may simply toggle a mode selection switch on the socket in the master bedroom to the gateway mode, so that the extender mode of the socket in the master bedroom can be switched to the gateway mode, and then the socket in the master bedroom is used as a gateway. Furthermore, the socket in the master bedroom sends a notification message to the socket in the living room, so that the socket in the living room switches from the current gateway mode to the extender mode according to the notification message, and then the socket in the living room is used as an extender.

Optionally, the user toggles a mode selection switch on the socket in the living room to the extender mode, so that the socket in the living room switches from the gateway mode to the extender mode, and then the socket in the living room is used as an extender. Furthermore, the socket in the living room sends a notification message to the socket in the master bedroom, so that the socket in the master bedroom switches from the current extender mode to the gateway mode according to the notification message, and then the socket in the master bedroom is used as a gateway.

In this embodiment, the user can simply toggle the mode selection switch once to change the current operating mode of the socket in the living room or the socket in the master bedroom, so that the broadband access location can be changed from the living room to the master bedroom without exchanging manually the router in the master bedroom with the router in the living room.

Figure 12:
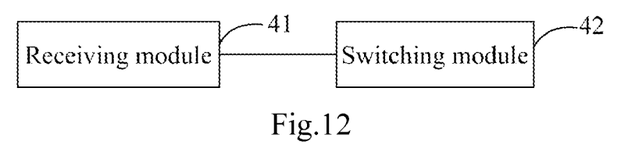
FIG. 12 is a schematic structural diagram of a socket with router function according to an embodiment of the invention.

FIG. 12 is a schematic structural diagram of a socket with router function according to an embodiment of the invention. As illustrated in FIG. 12, the socket includes a receiving module 41 and a switching module 42.

In an FTTH or ADSL or another broadband access mode, when a user wants to change the broadband access location, the receiving module 41 may receive a switching instruction sent from the user for instructing the socket to switch a current operating mode to a target operating mode, where the switching instruction carries the identifier of the target operating mode.

In this embodiment, the receiving module 41 is connected with the switching module 42, and after the receiving module 41 receives the switching instruction, the switching module 42 knows the target operating mode from the identifier of the target operating mode in the switching instruction and then switches the current operating mode to the target operating mode. Specifically, the switching module 42 may judge whether the current operating mode is consistent with the target operating mode according to the identifier of the target operating mode in the switching instruction and switch the current operating mode to the target operating mode if a judgment result is negative.

The socket with router function according to this embodiment receives the switching instruction for instructing the socket to switch the current operating mode to the target operating mode, where the switching instruction carries the identifier of the target operating mode, and the socket switches the current operating mode to the target operating mode according to the identifier of the target operating mode. In this embodiment, the socket can switch the current operating mode in response to the switching instruction upon reception of the switching instruction, to thereby perform free switching of the socket between the gateway mode and the extender mode and overcome the problem in the prior art that the operating mode of the router cannot be changed, thus improving the router in the prior art.

Figure 13:
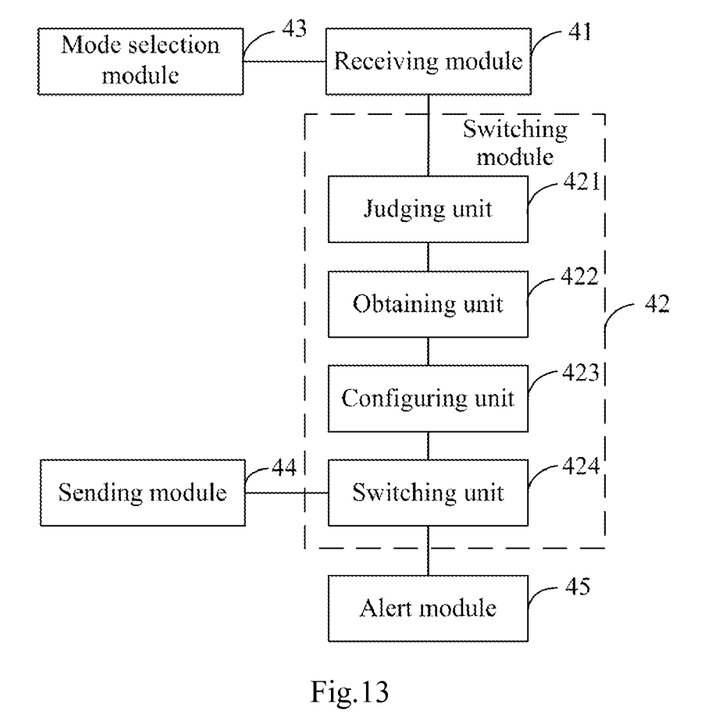
FIG. 13 is a schematic structural diagram of a socket with router function according to another embodiment of the invention.

FIG. 13 is a schematic structural diagram of another socket with router function according to an embodiment of the invention. As illustrated in FIG. 13, further to the socket according to the foregoing embodiment, in addition to the receiving module 41 and the switching module 42, the socket further includes a mode selection module 43 (equivalent to the second switch above) and a sending module 44.

In this embodiment, the receiving module 41 is configured to receive a switching instruction for instructing the socket to switch a current operating mode to a target operating mode, where the switching instruction carries the identifier of the target operating mode. The switching module 42 is configured to switch the current operating mode to the target operating mode according to the identifier of the target operating mode.

An optional structural implementation of the switching module 42 includes a judging unit 421, an obtaining unit 422, a configuring unit 423 and a switching unit 424.

The judging unit 421 may judge whether the current operating mode is consistent with the target operating mode according to the identifier of the target operating mode in the switching instruction. The obtaining unit 422 is connected with the judging unit 421, and when the judging unit 421 judges that the current operating mode is not consistent with the target operating mode, the obtaining unit 422 obtains a configuration file corresponding to the target operating mode. The socket may include a memory in which configuration files of the two operating modes are stored in advance, and when it is judged that the target operating mode is not consistent with the current operating mode, the obtaining unit 422 may download the configuration file corresponding to the target operating mode.

The obtaining unit 422 is connected with the configuring unit 423, and after the configuration file of the target operating mode is obtained, the configuring unit 423 runs the configuration file and configures the target operating mode through the configuration file, and the switching unit 424 switches the current operating mode to the target operating mode.

Optionally, the mode selection module 43 (equivalent to the second switch above) is arranged on the socket, and the mode selection module 43 is connected with the receiving module 41. When a user wants to change the current operating mode of the socket, the user may send a switching instruction to the receiving module 41 through the mode selection module 43. The mode selection module 43 may be a mode selection switch provided with two shifts, one of which is a first shift relating to the gateway mode and the other of which is a second shift relating to the extender mode.

It shall be noted that the switching instruction received by the socket includes but will not be limited to one transmitted by the user toggling the mode selection switch. In this embodiment, reference can be made to the related disclosure in the foregoing embodiment for a description of the user sending the switching instruction to the socket, and a repeated description thereof will be omitted here.

Furthermore, the socket according to this embodiment further includes the sending module 44. After the current operating mode of the socket is switched to the target operating mode, the sending module 44 may broadcast or uni-cast a notification message to other sockets connected with the socket, to notify the other sockets of the change in operating mode of the socket, so that the other sockets adjust their own current operating modes in response to the notification message. Specifically, the sending module 44 broadcasts or uni-casts the notification message to all the other sockets in an LAN of the same network segment.

The socket may be connected with the other sockets wirelessly, e.g., through WiFi, and then the socket may transmit a wireless signal and send a notification message to the other sockets wirelessly. However, the wireless signal may be subject to a through-wall loss when the socket transmits the wireless signal through a wall. In order to overcome the problem of the through-wall loss in transmission of the wireless signal, the PLC technology can be utilized to transmit data through a pre-embedded power line, to extend coverage of the wireless signal of the socket. In this embodiment, the socket is connected with the other sockets through a power line, so that the sending module 44 can send the notification message through the power line to avoid the through-wall loss of the wireless signal. Optionally, the socket may be connected with the other sockets through a network cable and send the notification message to the other sockets through the network cable.

In this embodiment, after the switching module 42 switches the socket from the extender mode to the gateway mode, the sending module 44 sends a first broadcast message carrying the identifier of the socket to the other sockets connected with the socket, so that a gateway socket currently in the gateway mode among the other sockets switches from the gateway mode to the extender mode, and each of the other sockets is instructed to modify a gateway configuration parameter according to the identifier of the socket, where the identifier of the socket may be an IP address of the socket. Specifically, the gateway socket currently in the gateway mode among the other sockets switches automatically the current gateway mode to the extender mode and is used as an extender upon reception of the first broadcast message. The other sockets may modify the IP address of the gateway to the IP address of the socket upon reception of the first broadcast message.

Optionally, a memory is arranged in the socket to store therein in advance IP addresses and/or MAC addresses of the respective sockets. In this embodiment, the sending module 44 may send the notification message respectively to each of the other sockets by means of the IP or MAC addresses.

Specifically, the sending module 44 obtains the address information of the gateway socket currently in the gateway mode among the other sockets connected with the socket from the pre-stored address information of the sockets, and sends an instruction message to the gateway socket according to the address information of the gateway socket, and the gateway socket switches from the gateway mode to the extender mode upon reception of the instruction message. Furthermore, the sending module 44 sends a first notification message carrying the identifier of the socket respectively to each of the other sockets according to the address information of the each of the other sockets, and the each of the other sockets modifies the gateway configuration parameter according to the identifier of the socket by modifying the IP address of the gateway to the IP address of the socket.

When the current operating mode of the socket is the gateway mode, the switching instruction instructs the socket to switch from the current gateway mode to the extender mode. After the switching module 42 switches from the gateway mode to the extender mode, the sending module 44 selects one of the other sockets connected with the socket as a gateway socket, and at this time the current operating mode of the gateway socket is the extender mode. The sending module 44 sends a second broadcast message carrying the identifier of the gateway socket to the other sockets, where the identifier of the gateway socket may be an IP address of the gateway socket. The gateway socket switches from the extender mode to the gateway mode upon reception of the second broadcast message. Each of the other sockets modifies the gateway configuration parameter by configuring the IP address of the gateway to the IP address of the gateway socket according to the identifier of the gateway socket upon reception of the second broadcast message.

Optionally, the sending module 44 selects one of the other sockets as a gateway socket and obtains the address information of the gateway socket from pre-stored address information of the sockets, and sends an instruction message to the gateway socket according to the address information of the gateway socket, and the gateway socket switches from the extender mode to the gateway mode upon reception of the instruction message. Furthermore, the sending module 44 sends a second notification message carrying the identifier of the gateway socket respectively according to the address information of each of the other sockets, so that the each of the other sockets modifies the gateway configuration parameter according to the identifier of the gateway socket by configuring the IP address of the gateway to the IP address of the gateway socket.

Optionally, the socket further includes an alert module 45. The alert module 45 is connected with the switching module 42 and configured to send alert information after the switching module 42 switches the current operating mode to the target operating mode, to notify the user that the operating mode of the socket has been switched to the target operating mode. The alert module 45 may send the alert information by popping up a dialogue box, through voice announcement, a beeper, an LED, a liquid crystal screen, etc.

The socket according to this embodiment will be described below by way of an example in which the broadband access location is changed from a living room to a master bedroom.

When a broadband access is directed to the living room, a socket in the living room is used as a gateway, that is, the socket in the living room is in an operating mode which is the gateway mode, and a socket in the master bedroom is used as an extender, that is, the socket in the master bedroom is in an operating mode which is the extender mode.

When a user attempts to have the broadband access directed to the master bedroom, the socket in the master bedroom needs to be used as a gateway, and the socket in the living room needs to be used as an extender, and in this case, the user may simply toggle a mode selection switch on the socket in the master bedroom to the gateway mode, so that the socket in the master bedroom can be switched from the extender mode to the gateway mode, and then the socket in the master bedroom is used as a gateway. Furthermore, the socket in the master bedroom sends a notification message to the socket in the living room, so that the socket in the living room switches from the current gateway mode to the extender mode, and then the socket in the living room is used as an extender.

Optionally, the user toggles a mode selection switch on the socket in the living room to the extender mode, so that the socket in the living room switches from the gateway mode to the extender mode, and then the socket in the living room is used as an extender. Furthermore, the socket in the living room sends a notification message to the socket in the master bedroom, so that the socket in the master bedroom switches from the current extender mode to the gateway mode, and then the socket in the master bedroom is used as a gateway.

In this embodiment, the user can simply toggle the mode selection switch once to change the current operating mode of the socket in the living room or the socket in the master bedroom, so that the broadband access location can be changed from the living room to the master bedroom without exchanging manually the router in the master bedroom with the router in the living room.

It shall be noted that the foregoing embodiments are merely illustrative of but not to limit the technical solution of the invention; and although the invention has been detailed in the foregoing embodiments, those ordinarily skilled in the art shall appreciate that they still can modify the technical solution disclosure in the foregoing embodiments or make equivalent substitutions to a part of the technical features therein; and these modifications or substitutions will not make the essence of the corresponding technical solution depart from the spirit and scope of the technical solutions according to the embodiments of the invention.

The invention claimed is:

1. A socket, comprising a socket body and a jack, wherein a network communication module is arranged inside the socket body; and the network communication module is connected with a mains line; and the network communication module is configured to provide a network signal of an Internet to a user with transmission of the network signal of the Internet through the mains line;

wherein the network communication module comprises a current converting module, a coupling module and a processing module; wherein the current converting module is connected with the mains line, the processing module is connected with the current converting module, and the coupling module is connected with the mains line and the processing module;

the current converting module is configured to convert an alternating-current signal transmitted on the mains line into a direct-current signal and to provide the processing module with the direct-current signal;

the coupling module is configured to extract a network signal from the alternating-current signal transmitted on the mains line, to transmit the extracted network signal to the processing module, to receive a network signal from the processing module and to load the received network signal onto the alternating-current signal transmitted on the mains line; and the processing module is configured to receive the extracted network signal transmitted by the coupling module, to demodulate the extracted network signal transmitted by the coupling module, to provide the user with the demodulated network signal, to receive a network signal transmitted by the user through a terminal device, to modulate the network signal transmitted by the user, and to transmit the modulated network signal transmitted by the user to the coupling module.

2. The socket according to claim 1, wherein at least one of a wired network interface, a wireless network interface and a Universal Serial Bus (USB) interface is connected to the processing module.

3. The socket according to claim 1, wherein the processing module comprises a control module and a power line communication module; wherein the control module is connected with the current converting module, and the power line communication module is connected with the current converting module and the control module;

the control module is configured to receive a network signal transmitted by the power line communication module, to provide the user with the network signal transmitted by the power line communication module, to receive the network signal transmitted by the user through the terminal device and to transmit the network signal transmitted by the user to the power line communication module; and the power line communication module is configured to receive the extracted network signal transmitted by the coupling module, to demodulate the extracted network signal transmitted by the coupling module, to transmit the demodulated extracted network signal to the control module, to receive the network signal transmitted by the control module, to modulate the network signal transmitted by the control module, and to transmit the modulated network signal to the coupling module.

4. The socket according to claim 3, wherein at least one of a wired network interface, a wireless network interface and a Universal Serial Bus (USB) interface is connected to the control module.

5. The socket according to claim 1, wherein the coupling module and the processing module are integrated on a digital circuit board of the socket body, and the current converting module is integrated on a power source board of the socket body.

6. The socket according to claim 5, wherein the digital circuit board of the socket body is isolated from the power source board.

7. The socket according to claim 6, wherein the digital circuit board of the socket body is arranged at an angle to the power source board.

8. The socket according to claim 1, wherein a vent is arranged on a housing of the socket body.

9. The socket according to claim 8, wherein a vent is arranged on a socket panel and the vent on the socket panel matches with the vent on the housing of the socket body.

10. The socket according to claim 5, wherein a first button is further arranged inside the socket body;

the first button is configured to resume the socket into a manufacturer setting or to enable the digital circuit board of the socket to negotiate with a digital circuit board of another socket about a key; and the first button is connected with the digital circuit board of the socket body.

11. The socket according to claim 10, wherein a first switch and a second switch are further arranged inside the socket body;

the first switch is configured to control the digital circuit board of the socket body to be enabled or disabled;

the second switch is configured to switch an operating mode of the socket, wherein the operating mode includes a gateway mode and an extender mode; and the first switch and the second switch are connected with the digital circuit board of the socket body.

12. The socket according to claim 11, wherein the second switch is connected with a processor and a memory, wherein program codes are stored in the memory, and the processor is configured to execute the program codes to:

receive a switching instruction for instructing the socket to switch a current operating mode to a target operating mode, wherein the switching instruction carries an identifier of the target operating mode; and switch the current operating mode to the target operating mode according to the identifier of the target operating mode.

13. The socket according to claim 12, wherein switching the current operating mode to the target operating mode according to the identifier of the target operating mode comprises:

judging whether the current operating mode is consistent with the target operating mode according to the identifier of the target operating mode;

obtaining a configuration file corresponding to the target operating mode when it is judged that the current operating mode is not consistent with the target operating mode;

running the configuration file to configure the target operating mode; and switching the current operating mode to the target operating mode.

14. The socket according to claim 13, wherein if the current operating mode of the socket is the extender mode, then the target operating mode is the gateway mode; or if the current operating mode of the socket is the gateway mode, then the target operating mode is the extender mode.

15. The socket according to claim 14, wherein if the current operating mode of the socket is the extender mode and the target operating mode is the gateway mode, then after the socket switches from the extender mode to the gateway mode, the socket sends a first broadcast message carrying an identifier of the socket to other sockets connected with the socket, so that a gateway socket currently in the gateway mode among the other sockets switches from the gateway mode to the extender mode, and each of the other sockets is instructed to modify a gateway configuration parameter according to the identifier of the socket.

16. The socket according to claim 14, wherein if the current operating mode of the socket is the gateway mode and the target operating mode is the extender mode, then after the socket switches from the gateway mode to the extender mode, the socket selects one of other sockets connected with the socket as a gateway socket, and sends a second broadcast message carrying an identifier of the gateway socket to the other sockets, so that the gateway socket switches from the extender mode to the gateway mode, and each of the other sockets is instructed to modify a gateway configuration parameter according to the identifier of the gateway socket.

17. The socket according to claim 14, wherein if the current operating mode of the socket is the extender mode and the target operating mode is the gateway mode, then after the socket switches from the extender mode to the gateway mode, the socket obtains address information of a gateway socket currently in the gateway mode among other sockets connected with the socket from a pre-stored list of address information of the sockets, and sends an instruction message to the gateway socket according to the address information of the gateway socket, so that the gateway socket switches from the gateway mode to the extender mode, and the socket sends a first notification message carrying an identifier of the socket respectively according to address information of each of the other sockets, so that the each of the other sockets modifies a gateway configuration parameter according to the identifier of the socket.

18. The socket according to claim 15, wherein if the current operating mode of the socket is the gateway mode and the target operating mode is the extender mode, then after the socket switches from the gateway mode to the extender mode, the socket selects one of other sockets connected with the socket a gateway socket, obtains address information of the gateway socket from pre-stored address information of the sockets, and sends an instruction message to the gateway socket according to the address information of the gateway socket to instruct the gateway socket to switch from the extender mode to the gateway mode, and the socket sends a second notification message carrying an identifier of the gateway socket respectively according to address information of each of the other sockets, so that the each of the other sockets modifies a gateway configuration parameter according to the identifier of the gateway socket.

19. The socket according to claim 12, wherein the switching instruction is sent by the user toggling the second switch.

20. The socket according to claim 12, wherein after the current operating mode is switched to the target operating mode, the socket sends alert information to notify the user that the socket is in the target operating mode.

21. The socket according to claim 11, wherein a first indicating lamp is further arranged inside the socket body;
the first indicating lamp is configured to indicate a power line communication connection status; and
the first indicating lamp is connected with the digital circuit board of the socket body.

22. The socket according to claim 1, wherein an annular light transmitting area is arranged at a section where the jack of the socket is engaged with a socket panel.

\* \* \* \* \*